United States Patent [19]

Mraz

[11] Patent Number: 5,190,134

[45] Date of Patent: Mar. 2, 1993

[54] FLEXIBLE MOBILE BRIDGE CONVEYOR

[75] Inventor: Dennis Z. Mraz, Saskatoon, Canada

[73] Assignee: Westfalia DME, Inc., Saskatoon, Canada

[21] Appl. No.: 809,920

[22] Filed: Dec. 20, 1991

[51] Int. Cl.⁵ .................................. B65G 41/00
[52] U.S. Cl. ......................... 198/303; 198/589
[58] Field of Search ............ 198/303, 589, 591, 313, 198/861.2; 299/43-46, 64-68

[56] References Cited

U.S. PATENT DOCUMENTS

| | | | |
|---|---|---|---|
| 2,805,758 | 9/1957 | Madeira et al. | 198/303 |
| 3,003,612 | 10/1961 | Poundstone | 198/303 |
| 3,209,895 | 10/1965 | Densmore | 198/303 |
| 3,974,907 | 8/1976 | Shaw et al. | 198/303 |
| 4,031,997 | 6/1977 | Nelson | 198/303 |
| 4,951,801 | 8/1990 | Mraz | 198/303 |

Primary Examiner—Joseph E. Valenza
Attorney, Agent, or Firm—Roylance, Abrams, Berdo & Goodman

[57] ABSTRACT

A flexible mobile bridge conveyor has a plurality of carriages connected to each other to form a train. Each carriage has an axle with wheels mounted on opposite ends thereof and encased in a housing. A first frame section is fixedly connected to the axle housing, and a second frame section has a proximal end pivotally connected to the first frame section so as to be pivotal about both a horizontal, longitudinal pivot axis and a horizontal, transverse axis. Linkage mechanisms are coupled to the first and second frame sections, for coupling adjacent carriages, so as to provide pivot movement about a vertical axis. This combination of linkages provides three degrees of freedom in order to enable the flexible mobile bridge conveyor to negotiate uneven roadway surfaces while following curved trajectory in the direction of movement.

12 Claims, 5 Drawing Sheets

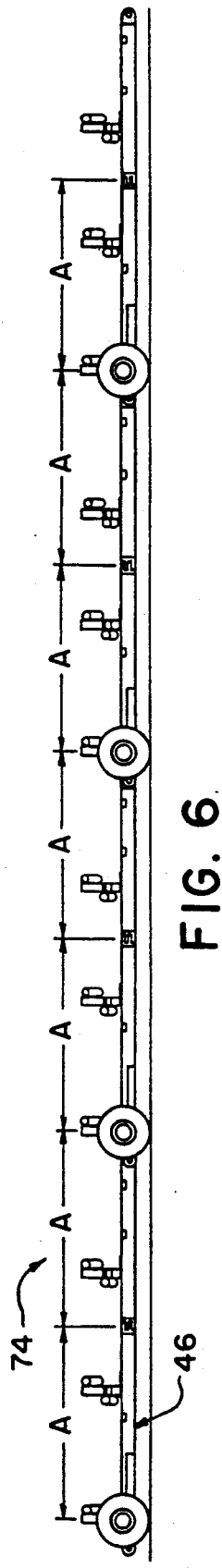
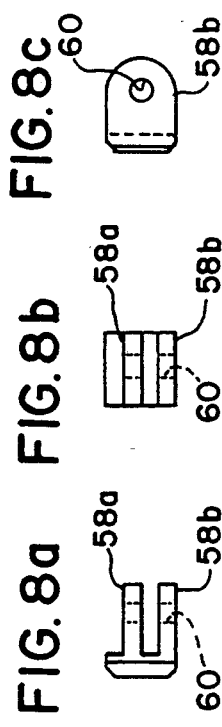
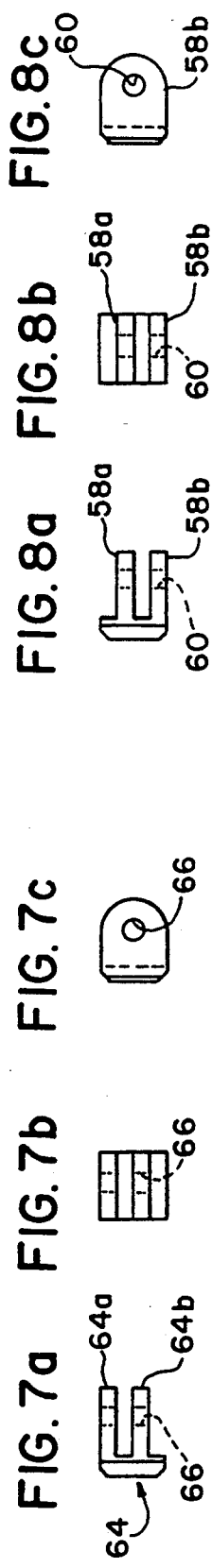
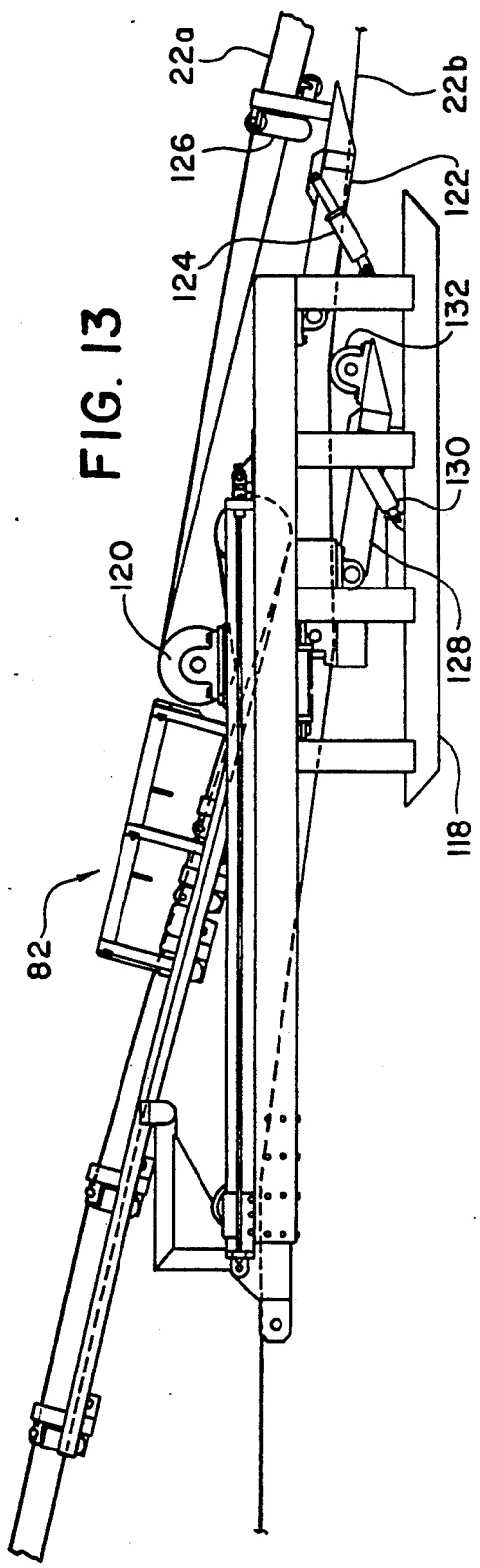

FLEXIBLE MOBILE BRIDGE CONVEYOR

BACKGROUND OF THE INVENTION

1. Field of the Invention

The present invention relates generally to the field of continuous haulage of coal or ores in underground or surface mines, and more specifically, to a flexible mobile bridge conveyor having a unique linkage and suspension to interconnect articulated, modular, self propelled bridged conveyor carriages.

2. Description of the Related Art

In conventional underground mining, a series of roadways (known as "rooms") and pillars are formed, while the coal or ore is excavated by a continuous mining machine. The roadways undulate, are generally very rough, and extend in several directions. In such mines, visibility is severely limited around the labyrinth of roadways and pillars due to poor lighting conditions and numerous obstructions.

Recently, several systems have been designed and built to convey the output of the continuous mining machine in a steady and uninterrupted flow to a remote transfer/loading point, in order to enhance the overall productivity of the operation. These systems have employed "bridge" conveyors, which consist of a series of interconnected vehicles that overlap each other to form "bridges" from one end of the conveying train of vehicles to the other.

Each of the individual bridges or carriages has a conventional belt or chain-and-flight type conveyor that moves the material loaded onto the bridge conveyor by a continuous mining machine from one end of the bridging vehicle to its other end. The material is transferred to each subsequent bridge, thus being delivered to the end of the series of interconnected carriages or vehicles. Each vehicle runs on a transversely aligned axle or axle with a set of wheels mounted on the ends of the axle or crawler-type carrying means, with the wheels or crawlers being driven by conventional means, such as an electric motor.

An important aspect of a continuous conveying system is its ability to negotiate corners (around the many pillars) and to traverse over the severely undulating and rough roadways. Breakdowns of such a system operating under the harsh environment of a mine are greatly reduced if the overall design is simple with a minimum of control mechanisms. Thus, a train of bridge conveyors needs to be simple, flexible, and operable with a minimum of manpower.

Commercially available bridge conveyors do not satisfy the above-noted needs. One commercially available system is manufactured by Kloeckner-Becorit. It features a continuous haulage system of bridge conveyors which cannot be moved while conveying the material because the whole train of vehicles have to be lowered for tramming and then raised for conveying. Such a system is briefly described in *Coal*, June 1989 edition.

Another commercially available conveyor is made by Long-Airdox. Also described in *Coal* magazine, this system requires several operators, one for each set of two bridges. If several operators are not used, these trains of bridge conveyor carriages are unable to follow or track behind the preceding train or vehicle, thereby resulting in major tramming problems. Unfortunately, the use of many operators for such conveyor train systems results in undesirably high operating costs.

Known means of coupling multiple vehicles together to form trains of bridging conveyors include variations of a standard ball and socket trailer hitch arranged and supported from structure attached generally to the end elements of each vehicle. This is considered to be unsuitable for the purposes of a bridging conveyor system in that the pivoting ball and socket joint with supporting structure generally interferes with the preferred material flow path between the conveyor elements of individual vehicles of the train.

SUMMARY OF THE INVENTION

An object of the present invention is to provide a linkage mechanism for a flexible mobile bridge conveyor which allows plural conveyors connected together to track behind preceding conveyors during longitudinal movement without the need for complex control mechanisms.

Another object of the present invention is to provide a flexible mobile bridge conveyor capable of moving along uneven roadway surfaces which alternatively extend in several directions.

Another object of the present invention is to provide a flexible mobile bridge conveyor capable of maximizing throughput of material while minimizing spillage of conveyed material.

Another object of the present invention is to provide a flexible mobile bridge conveyor capable of operating with a minimum of manpower.

These and other objects of the invention are met by providing a flexible mobile bridge conveyor having a plurality of carriages connected to each other to form a train, each carriage comprising an axle having wheels mounted on opposite ends thereof and being encased in a housing, a first frame section fixedly connected to the axle housing, a second frame section having a proximal end pivotally connected to the first frame so as to be pivotal about both a horizontal, longitudinal pivot axis and a horizontal, transverse pivot axis, and linkage means coupled to the first section and being connectable to the adjacent frame such as to enable relative pivoting about a vertical axis between the adjacent frames of the carriage.

In another embodiment of the present invention, a linkage mechanism for connecting two adjacent carriages of a mobile conveyor includes a pair of longitudinally disposed struts pivotally interconnected through a pair of cross beams to form a variable parallelogram, and pivot means for pivotally connecting the pair of cross beams to one carriage, the two struts having distal ends connectable to the other carriage.

These and other features and advantages of the flexible mobile bridge conveyor of the present invention will become more apparent with reference to the following detailed description and drawings.

BRIEF DESCRIPTION OF THE DRAWINGS

FIG. 6 is a sectional view taken along line B—B of FIG. 3;

FIG. 7 is a top view of a flexible mobile bridge conveyor according to a second preferred embodiment of the present invention;

FIG. 8 is a side elevational view of the flexible mobile bridge conveyor of FIG. 7;

DETAILED DESCRIPTION OF THE PREFERRED EMBODIMENTS

Referring now to FIGS. 1 through 6, a first preferred embodiment of the present invention will be described. A flexible mobile bridge conveyor is generally referred to by the numeral 20 and includes a plurality of carriages 22, 24, 26, 28, etc., which are connected to each other to form a train.

Figure 1:
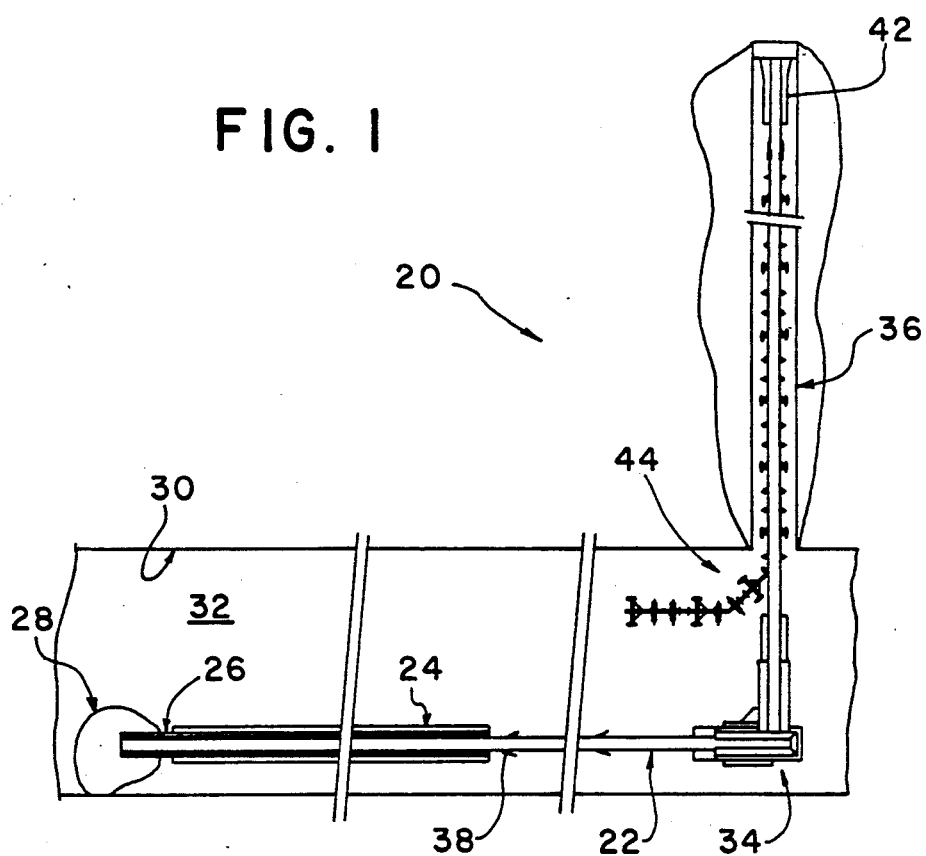
FIG. 1 is a top view of a flexible mobile bridge conveyor according to a first, preferred embodiment of the present invention.
Figure 2:
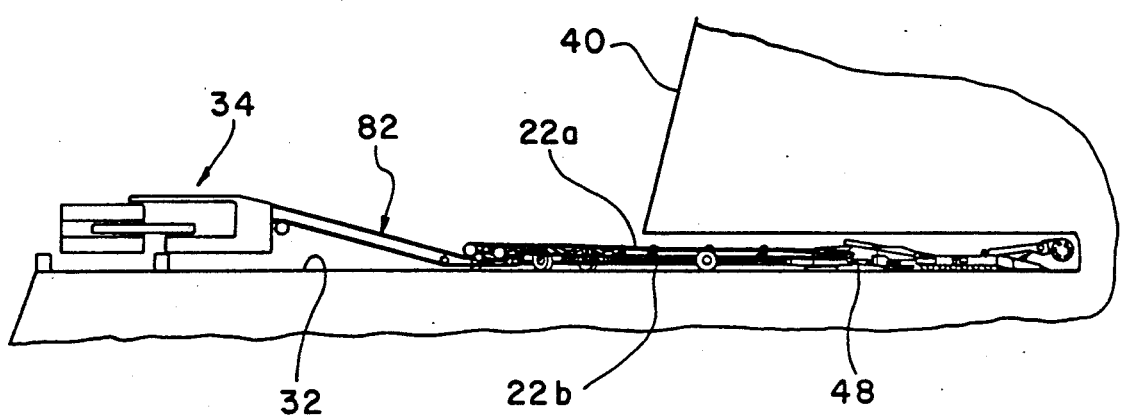
FIG. 2 is a side elevational view of the flexible mobile bridge conveyor of FIG. 1.
Figure 3:
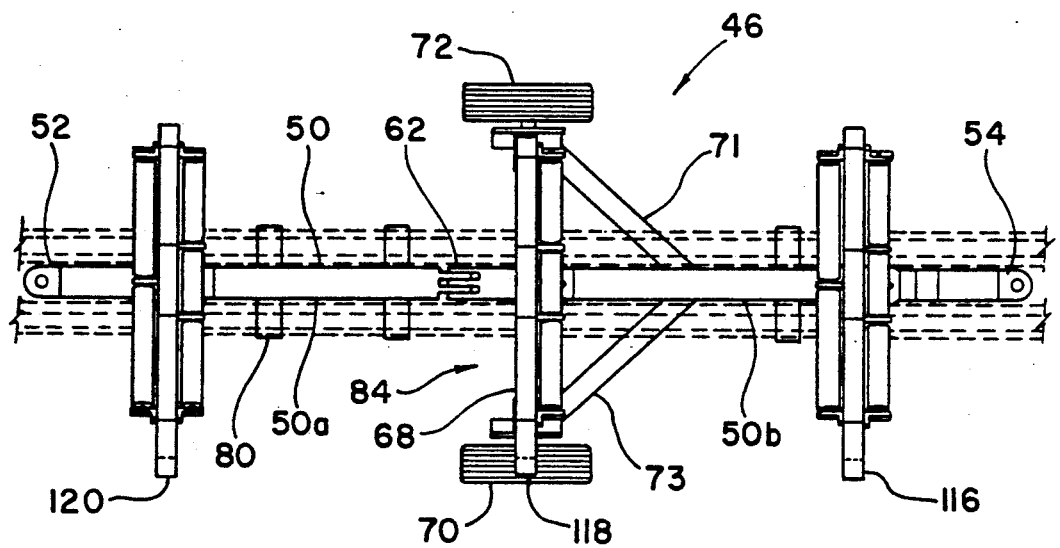
FIG. 3 is an enlarged plan view of one of the carriages of the FIG. 1 embodiment.

Each carriage is modular and made of three articulated and interconnected sections, in addition to a transversely aligned powered wheeled axle intermediate of the longitudinal ends of each carriage As shown in FIGS. 1 and 2, the distance X between axles is equal to the overall length of each carriage.

One preferred embodiment of the carriages is to locate the axle position relative to the vertical pivot axes exactly at the middle position of the pivots. This results in a steering geometry in which each set of wheels mounted on the axles will follow exactly in the paths of the preceding corresponding set of wheels.

Referring now to FIGS. 3 through 6, each carriage includes an axle 30 having wheels 32 driven thereby. The axle 30 is encased in an axle housing 34 and is driven by drive means which include, for example, an electric motor 36, a transmission 38, and differential gearing 40.

Figure 4:
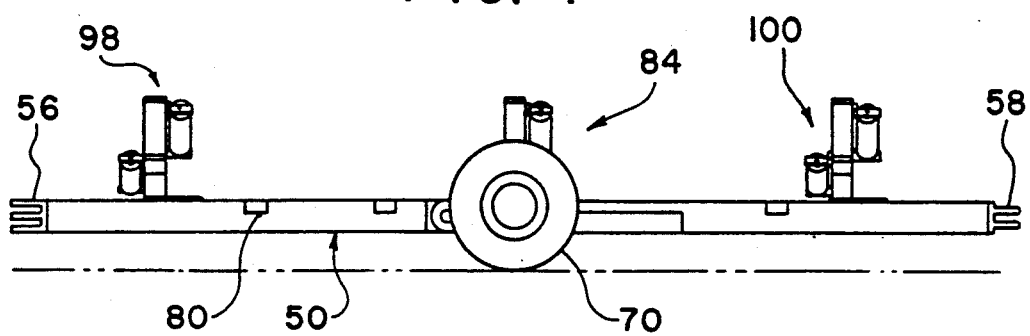
FIG. 4 is an enlarged, side elevational view of the carriage of FIG. 3.
Figure 5A:
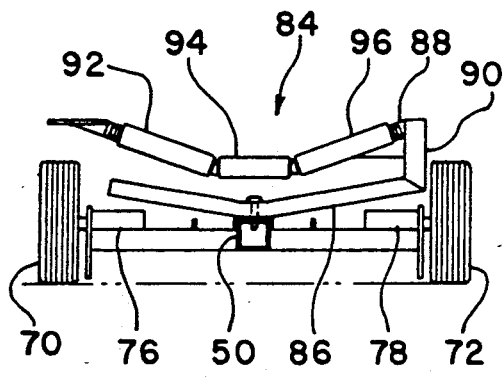
FIG. 5 is a sectional view taken along line A—A of FIG. 3.
Figure 5B:
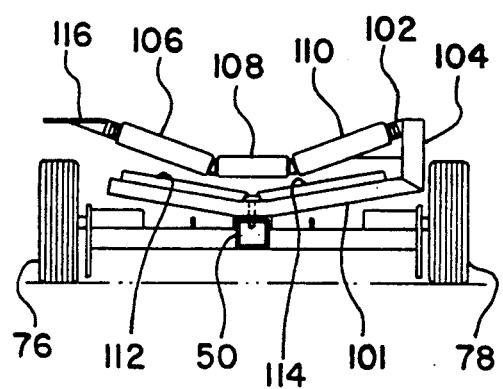
Figure 9:
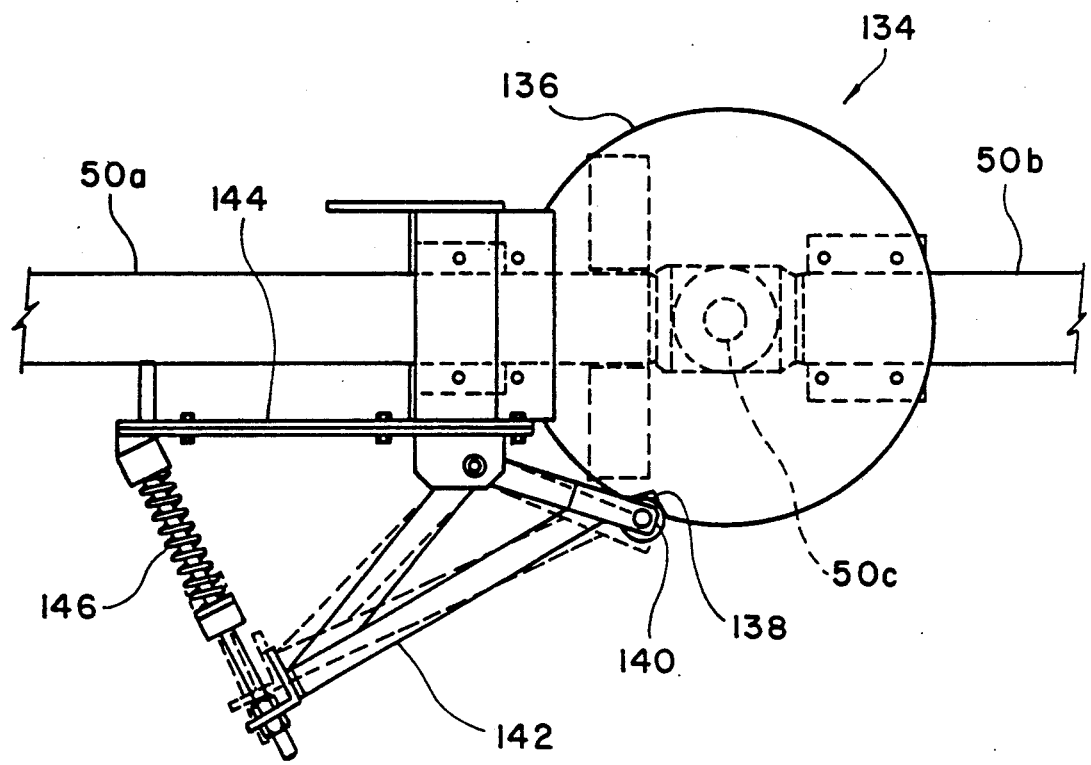
FIG. 9 is an enlarged, plan view of one of the carriages of the FIG. 7 embodiment.
Figure 10:
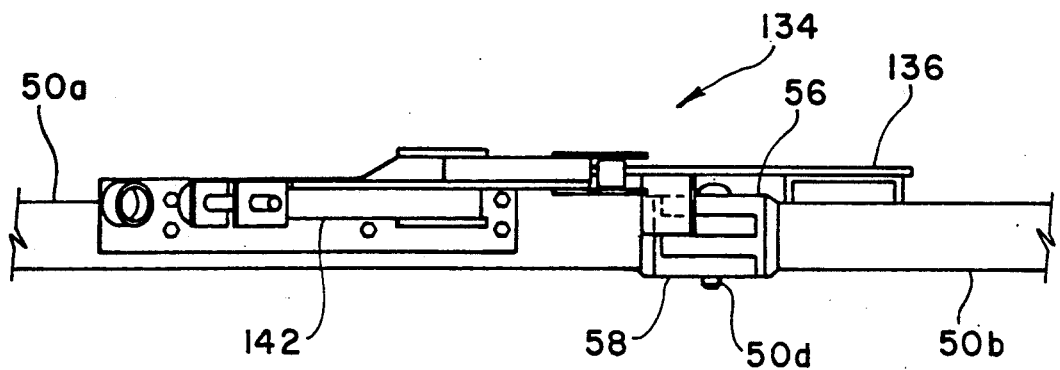
FIG. 10 is an enlarged, side elevational view of the carriage of FIG. 9.
Figure 11:
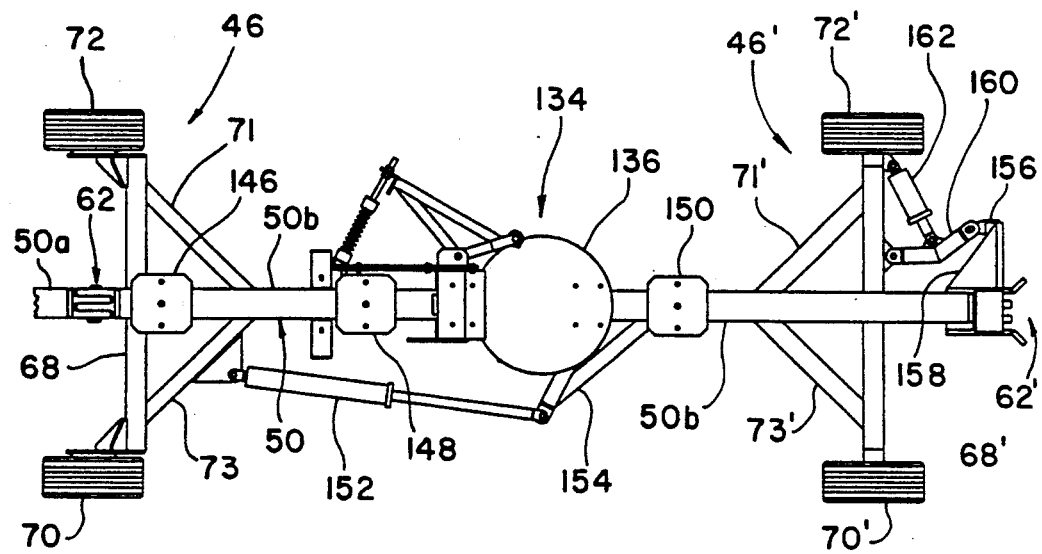
FIG. 11 is a sectional view taken along line A—A of FIG. 9.
Figure 12:
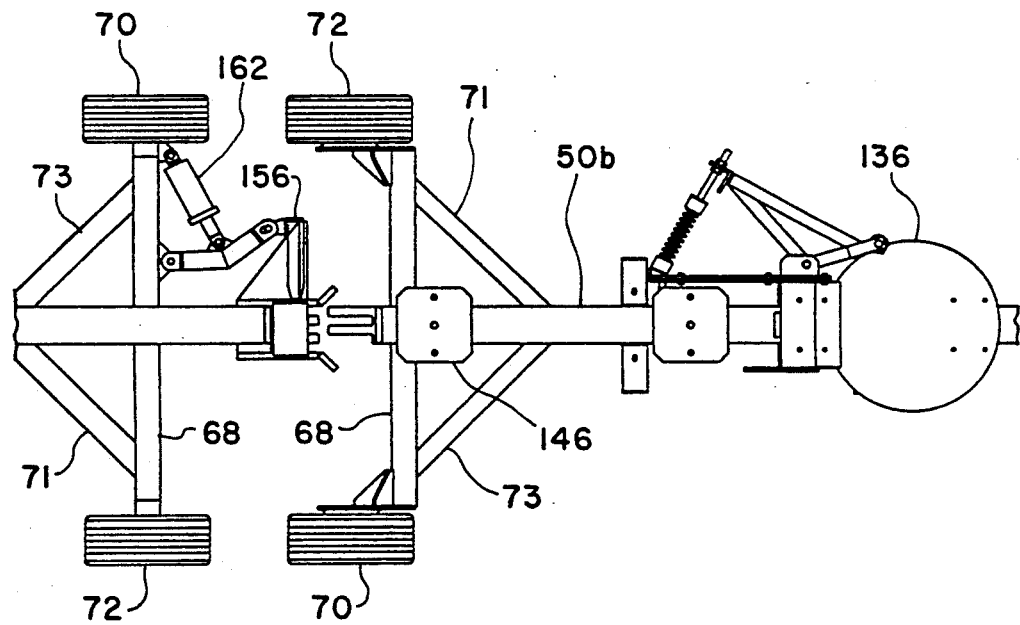
FIG. 12 is a sectional view taken along line B—B of FIG. 9.

A first frame section 42 is fixedly connected to the axle housing 34 through conventional means, such as brackets 44 and 46. The first frame section 42 includes a pair of longitudinally disposed beams 48 and 50, each of which is made of two, obtusely angled portions 50a and 50b as illustrated in FIG. 4. The two lower portions of the first frame section 42 are fixedly connected to the axle housing, and carry the drive means. The upper portion of the first frame section is substantially horizontal and carries at its distal end a turn around roller 52 for a conveyor belt (shown in phantom lines in FIGS. 2 and 4). An additional guide roller 53 is also carried by the first frame section and can be used as a tension roller. For the sake of simplicity, no drive means has been shown for the conveyor belt. A conventional electric motor could be mounted either on the axial end of roller 52, or within the roller, or connected to the roller through a simple gear and chain arrangement.

At a proximal end portion of the first frame section 42 a cross bar 54 is fixedly connected between the two longitudinal beams 48 and 50 to provide torsional stability and to provide a mount for a pivotal connection of a second frame section 56. The second frame section 56 includes a pair of longitudinally disposed beams 58 and 60, each of which has a clevis 62 and 64, respectively, formed at distal ends thereof. Also at the distal end, a turn around roller 66 is rotatably mounted between the two beams 58 and 60 and receives an endless conveyor in conjunction with the other turn around roller 52. A conveyor drive means could, alternatively be provided at this end of the carriage.

The longitudinal beams 58 and 60 are pivotally connected to a transverse mounting beam 68 (FIG. 5) so as to be pivotal about a horizontal pivot axis defined between pivot connections 70 and 72. The pivot connections 70 and 72 pivotally connect the longitudinal beams 58 and 60 to the transverse support beam 68. The horizontal pivot axis defined between the pivot connections 70 and 72 is vertically aligned with the rotation axis for the wheels 32.

A longitudinally disposed pivot pin 74 is mounted between brackets 76 which are fixedly connected to the transverse beam 54 so as to permit limited rotation of the second frame section about a longitudinal pivot axis which is substantially aligned with the longitudinal axis of the overall carriage structure. Thus, the structure illustrated and described herein permits the two frame sections to pivot relative to each other to allow two degrees of freedom, thereby permitting travel over uneven floors common to mining environments.

A linkage mechanism is carried by the upper portion of the first frame section 42 and includes a pair of struts 78 and 80, each of which is pivotally connected to transverse cross beams 82 and 84 at the opposite ends thereof through pivot connections 86, 88, 90 and 92.

A pair of cross beams 94 and 96 are disposed fixedly between the longitudinal beams 48 and 50 of the first frame section 42. At about the longitudinal axis of the carriage, a pair of pivot posts 98 and 100 extend downwardly to pivotally mount the cross beams 82 and 84. This arrangement permits a variable parallelogram structure, in which the struts 78 and 80 are capable of translation in opposite, parallel directions when the carriage is turned, so as to permit a delayed action steering of the following carriage which is connected to connectors 102 and 104 provided at distal ends of the struts 78 and 80, respectively.

Referring now to FIGS. 7 through 12, a second preferred embodiment of the present invention is illustrated and described below. A flexible mobile bridge conveyor 20' has a plurality of carriages 22', 24', 26' and 28'.

One of the carriages, illustrated in more detail in FIGS. 9 through 12, includes an axle encased in an axle housing 34' with wheels 32' rotatably driven and supported at opposite ends of the axle. Drive means for driving the wheels through the axle include an electric motor 36', a transmission 38' and differential gearing 40'.

All of the major components of the embodiment depicted in FIGS. 7 through 12 correspond to those found in the embodiment of FIGS. 1 through 6 and are designated by similar reference numerals. The difference between the two embodiments lies in the fact that the second frame section in the embodiment of FIGS. 7 through 12 is pivotally connected to the first frame section 42' and is thus pivotal about a transverse, horizontal pivot axis but is not pivotal about a longitudinal, horizontal pivot axis. Thus, the two frame sections are movable relative to each other in only one degree of freedom. However, the linkage mechanism is permitted to move about ball and socket joints 99 and 101, which are used in place of the pivot post 98 and 100 of the embodiment of FIGS. 1 through 6. The linkage mechanism of the embodiment of FIGS. 7 through 12 functions the same way, whereby a variable parallelogram is created by a pair of struts 78' and 80' which are pivotally connected to cross beams 82' and 84' with the cross beams providing a ball and socket connection to the cross beams 94' and 96'.

Numerous modification and adaptations of the present flexible mobile bridge conveyor will be apparent to those so skilled in the art and thus, it is intended by the following claims to cover all such modifications and adaptations which fall within the true spirit and scope of the invention.

What is claimed:

1. A flexible mobile bridge conveyor having a plurality of carriages connected to each other to form a train, each carriage comprising:
    an axle having wheels mounted on opposite ends thereof and being encased in a housing;
    a first frame section fixedly connected to the axle housing;
    a second frame section having a proximal end pivotally connected to the first frame section so as to be pivotal about both a horizontal, longitudinal pivot axis and a horizontal, transverse axis; and
    a linkage means, coupled to the first frame section, for coupling an adjacent carriage.

2. A flexible mobile bridge conveyor according to claim 1, wherein the linkage means includes a pair of struts pivotally connected to each other and the first frame section to form a variable parallelogram, each strut having a distal end connectable to the adjacent carriage.

3. A flexible mobile bridge conveyor according to claim 2, wherein each strut has a first pivot post at a proximal end and a second pivot post at a medial portion thereof, the pair of struts being pivotally linked by a pair of cross beams, one pivotally connected between the first pivot post of the struts and the other being pivotally connected between the second pivot post of the struts, the cross beams being pivotally connected to the first frame section by a third pivot post extending downwardly from the first frame section and being journalled in the first cross beam and a fourth pivot post extending downwardly from the first frame section and being journalled in the second cross beam.

4. A flexible mobile bridge conveyor according to claim 3, wherein the first, second, third and fourth pivot posts have vertical pivot axes.

5. A flexible mobile bridge conveyor according to claim 4, wherein the pivot axes of the third and fourth pivot post are substantially in line with the longitudinal axis of the carriage.

6. A flexible mobile bridge conveyor according to claim 1, wherein the first frame section has a distal end portion which carries a first turn around roller for mounting an endless conveyor belt.

7. A flexible mobile bridge conveyor according to claim 6, wherein the second frame section has a distal end portion which carries a second turn around roller for mounting the endless conveyor belt.

8. A flexible mobile bridge conveyor according to claim 1, wherein the second frame section includes a pair of longitudinally extending arms and a transverse mounting beam connected to the axle housing and having opposite ends pivotally connected to the pair of longitudinally extending arms, for rotating the arms about the transverse pivot axis.

9. A flexible mobile bridge conveyor according to claim 8, wherein a medial portion of the transverse mounting beam is pivotally connected to the axle housing for rotating the arms about the longitudinal pivot axis.

10. A flexible mobile bridge conveyor according to claim 1, wherein the first frame section includes a pair of longitudinally extending arms, each having two obtusely angled sections so as to define a lower portion of the first frame section and an upper portion of the first frame section, the lowest portions being fixedly connected to the axle housing and the upper portions supporting the linkage means.

11. A flexible mobile bridge conveyor according to claim 10, wherein the upper portion of the first frame section is substantially horizontal.

12. A flexible mobile bridge conveyor according to claim 11, further comprising drive means, coupled to the axle and supported by a lower end of the lower portion of the first frame section, for driving the wheel.

* * * * *